(12) United States Patent
Brettschneider

(10) Patent No.: US 11,099,565 B2
(45) Date of Patent: Aug. 24, 2021

(54) METHOD FOR PROVIDING PERSONAL STOWAGE USING A HIGHLY OR FULLY AUTOMATICALLY OPERATED VEHICLE

(71) Applicant: Robert Bosch GmbH, Stuttgart (DE)

(72) Inventor: Thomas Brettschneider, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 105 days.

(21) Appl. No.: 16/423,336

(22) Filed: May 28, 2019

(65) Prior Publication Data

US 2019/0361441 A1    Nov. 28, 2019

(30) Foreign Application Priority Data

May 28, 2018    (DE) .......................... 102018208362.2

(51) Int. Cl.
| | |
|---|---|
| G05D 1/00 | (2006.01) |
| G08G 1/00 | (2006.01) |
| G06Q 10/08 | (2012.01) |
| B60R 25/102 | (2013.01) |
| B60R 25/10 | (2013.01) |

(52) U.S. Cl.
CPC ....... *G05D 1/0088* (2013.01); *B60R 25/1001* (2013.01); *B60R 25/102* (2013.01); *G06Q 10/08* (2013.01); *G08G 1/20* (2013.01); *B60W 2556/45* (2020.02)

(58) Field of Classification Search
CPC .............. G05D 1/0088; B60R 25/1001; B60R 25/102; G08G 1/20; B60W 2556/45; B60W 2556/50; G06Q 10/08; G07F 17/12

USPC ........................................................... 701/23
See application file for complete search history.

(56) References Cited

U.S. PATENT DOCUMENTS

| | | | |
|---|---|---|---|
| 9,387,928 B1 * | 7/2016 | Gentry ................. | G08G 5/0052 |
| 9,561,941 B1 * | 2/2017 | Watts ................... | G05D 1/0297 |
| 10,089,808 B2 * | 10/2018 | Perez .................. | G07C 9/00912 |
| 10,719,805 B2 * | 7/2020 | Ferguson ............ | A47J 37/0658 |
| 2005/0275234 A1 * | 12/2005 | Ottenthal ................ | E05G 1/005 |
| | | | 296/10 |
| 2014/0081445 A1 * | 3/2014 | Villamar ............. | G06Q 10/087 |
| | | | 700/216 |
| 2015/0006005 A1 * | 1/2015 | Yu .......................... | G06Q 50/28 |
| | | | 701/22 |
| 2018/0144300 A1 * | 5/2018 | Wiechers ................ | G07F 17/12 |
| 2018/0330313 A1 * | 11/2018 | Clarke .................. | G06Q 10/08 |
| 2019/0130349 A1 * | 5/2019 | Ferguson .......... | G06Q 10/08355 |

FOREIGN PATENT DOCUMENTS

| | | |
|---|---|---|
| DE | 102015011017 A1 | 3/2016 |
| DE | 102017101341 A1 | 7/2017 |
| DE | 102017207859 A1 | 12/2017 |
| DE | 102017122965 A1 | 4/2018 |

* cited by examiner

*Primary Examiner* — John A Tweel, Jr.
(74) *Attorney, Agent, or Firm* — Norton Rose Fulbright US LLP; Gerard Messina

(57) ABSTRACT

A method for providing personal stowage using a highly or fully automatically operated vehicle includes receiving a request signal, which includes information about a desired provisioning location for providing a personal stowage, ascertaining the location of the requested personal stowage, and transmitting a provisioning signal to an automatically operated vehicle for providing the personal stowage at the provisioning location using the automatically operated vehicle.

20 Claims, 3 Drawing Sheets

METHOD FOR PROVIDING PERSONAL STOWAGE USING A HIGHLY OR FULLY AUTOMATICALLY OPERATED VEHICLE

CROSS REFERENCE

The present application claims the benefit under 35 U.S.C. § 119 of German Patent Application No. DE 102018208362.2 filed on May 28, 2018, which is expressly incorporated herein by reference in its entirety.

FIELD

The present invention relates to a method for providing personal stowage using a highly or fully automatically operated vehicle.

BACKGROUND INFORMATION

Vehicles capable of being operated in automated fashion are, in the future, to be used to transport persons. In order to ensure the highest possible capacity utilization of these vehicles, they are preferably used as an alternative to conventional taxis.

SUMMARY

The present invention provides a method for providing personal stowage using a highly or fully automatically operated vehicle including the steps
  receiving a request signal, which includes information about a desired provisioning location for providing a personal stowage;
  ascertaining the location of the requested personal stowage;
  transmitting a provisioning signal to an automatically operated vehicle for providing the personal stowage at the provisioning location using the automatically operated vehicle.

A highly automatically operated vehicle is understood as a vehicle that has at least SAE Level 3 (according to the SAE J3016 standard). A fully automatically operated vehicle is understood as a vehicle that has at least SAE Level 4. The vehicle may be capable for example to drive certain route sections entirely autonomously, but may request or require the intervention of a driver in special situations or areas outside of these specific route sections. Alternatively, the vehicle may also be a vehicle that is capable of being operated in completely driverless fashion. In this case, it is no longer necessary for the vehicle to have control means for a driver such as a steering wheel, accelerator pedal or brake pedal. When an automatically operated vehicle is mentioned in this application, this vehicle may be both a highly as well as a fully automatically operated vehicle.

In the present application, a personal stowage is understood as a stowage that is assigned to a user or a defined group of users. This stowage offers the possibility of receiving personal items of the user or the users, to store them and upon request to provide them again to the user or users. The stowage may be a container or suitcase for example, which is either located in an automatically operated vehicle or which may be transported by an automatically operated vehicle. The personal stowage in particular does not refer to vessels or containers that are conceived primarily for transporting food or packages to end customers and which contain personal items such as in this example food, or the content of the packages, merely for single use. Personal stowage is preferably understood as stowage in which personal items are deposited only by the user or users of the stowage and are retrieved by the same. Access may possibly be granted to third parties by an authorization on the part of the user or users.

The request signal may be for example a query of a customer who would like to have personal stowage provided. This signal may be generated for example via a mobile telephone and/or an app.

The ascertained location may be a static location or a location that changes over time. Static locations may be for example special storehouses for the personal stowage or apartments/houses of users of the personal stowage units. The location may change over time, for example if the personal stowage happens to be located in an automatically operated vehicle or in a mobile store (e.g., FIG. 8, 805) for personal stowage units. Such a mobile store may be implemented for example by a transporter or truck, this mobile store moving in accordance with respectively recorded and analyzed user data and/or the current positions of automatically operated vehicles.

Consequently, when ascertaining a location, a position of an automatically operated vehicle, in which the personal stowage is located, or a position of a mobile stowage, a storage box or a container stored in a fixed or mobile store may be ascertained, for example. In the step of ascertaining, it may therefore suffice to ascertain merely the position of the automatically operated vehicle.

The ascertainment of the location of the personal stowage may occur for example via bar codes, RFID chips or other identifiers attached to the containers/the mobile stowage units. The stowage units may also be serially numbered for example and/or be stored accordingly so as to make it possible to locate them on the basis of the container number.

The transmitted provisioning signal may be transmitted for example from a central server or directly from a terminal device to the vehicle. It may contain information about the location of the personal stowage, the provisioning location, a desired destination, a desired provisioning time and further details. It is also possible for the provisioning signal to contain route suggestions, traffic information, weather information, information about passability of specific road sections and/or areas and other information relevant for providing the personal stowage.

One disadvantage with respect to the automatically operated vehicles described in the related art is that in a shared vehicle it is not possible to use stowage for personal items when leaving the vehicle. Consequently, all objects that were brought into the vehicle at the beginning of the trip must be removed again at the end of the trip. The non-existing private stowage in a vehicle is rated negatively by potential customers of such an automatically operated vehicle and possibly presents an obstacle for using a respective alternative mobility concept.

Precisely this obstacle is removed by the present invention. The possibility of being able to use personal stowage in an automatically operated vehicle increases the customer benefit and the acceptance of a respective mobility service. This makes it possible to gain new customer groups. The method moreover allows for the mobility concept to be extended by new business models. Thus it is possible to sell to customers nearly unlimited stowage as an additional option. This results in new sources of sales for a mobility service.

In order to make the service even more interesting for customers, in another specific embodiment, modern algorithms, implemented for example by neural networks, may be used in order to reduce the waiting time for the personal stowage. For example, a required piece of sports equipment may be retrieved by an automatically operated vehicle prior to a regularly occurring appointment already before the automatically operated vehicle is requested. Or the automatically operated vehicle, in which the personal stowage is located, may already be in proximity to the predicted provisioning location at the respective times.

Another specific embodiment of the method includes the additional step of transmitting a retrieval signal to an automatically operated vehicle for retrieving the personal stowage from the ascertained location using the automatically operated vehicle.

This step may occur before or after receiving the request signal. By using modern algorithms (e.g. AI) and personal data it is possible to reduce the waiting times for the personal stowage markedly. Thus, for a regular appointment for sports activity, it is possible for example to retrieve the associated sports equipment from a storage location already prior to receiving the request signal. The automatically operated vehicle may still be used by other customers in the vicinity of the expected retrieval location up until the actual request.

In another specific embodiment, the personal stowage of the customer is not retrieved from the storage location only after the request of the vehicle, but, in the case of a presumed demand, already in advance. The respective automatically operated vehicle is then used in a spatially limited way in the area of the presumed request by the customer, so that it is available for the customer at short notice. The decision may be made for example by calculating a probability, the probability having to surpass a limit value (e.g. 80%). This specific embodiment has in particular the advantage of reducing the waiting time for customers markedly. This increases customer benefit and the acceptance of the mobility service.

In another specific embodiment of the method, in the ascertainment of the location, an automatically operated vehicle is ascertained in which the personal stowage is located. The provisioning signal for providing the personal stowage is sent to this automatically operated vehicle.

This specific embodiment is suitable in the event that the personal stowage is currently located in an automatically operated vehicle. It is also suitable for cases in which the personal stowage units are components of specific automated vehicles and the stowage units remain fixedly connected to the vehicles.

Another specific embodiment of the method (FIG. 3) includes the additional step of receiving (step 301) a destination signal, which contains information about a destination for which the automatically operated vehicle is to head, and the additional step of transmitting (step 302) the destination signal or a modified destination signal to the automatically operated vehicle for automatically driving the automatically operated vehicle from the provisioning location to the destination.

This specific embodiment of the present invention emphasizes once more the primary benefit of the proposed method which provides a user of a mobility service, by which he is transported from one location to another location, with a personal stowage on this trip and on future trips with the same mobility service. The destination here corresponds to a location to which the user would like to be transported by the automatically operated vehicle together with his personal stowage.

In another specific embodiment, it is possible to have the personal stowage provided only at the destination by another automatically operated vehicle. This means that the user is transported by an automatically operated vehicle and that the personal stowage is provided by another automatically operated vehicle. In this special exemplary embodiment, the provisioning location may be identical with the destination.

This specific embodiment of the present invention offers the advantage of reducing waiting times if the personal stowage is not located in a favorable position at the time of the request. This increases the acceptance of this kind of mobility service for a customer.

Another specific embodiment of the method (FIG. 4) includes the additional step of transmitting (step 401) a transport signal for transporting the personal stowage from the ascertained location to a storage location using the automatically operated vehicle.

This specific embodiment of the present invention offers the advantage that the personal stowage does not have to remain in an automatically operated vehicle when the latter may possibly be used by other users of the automatically operated vehicle. For this purpose, the personal stowage units may be stored in special repositories that have either fixed locations or that are likewise moving. This additionally makes it possible to increase the size of the personal stowage units since prior to the usage by another user of the automatically operated vehicle the personal stowage of the previous user may be removed and consequently a new personal stowage may be taken into the automatically operated vehicle.

In another specific embodiment of the method, the transport signal, in particular the storage location, is ascertained on the basis of recorded user data.

The user data in this case are in particular data of users of the personal stowage units. After the customer exits the vehicle, the system selects a suitable storage location for the personal stowage. For this purpose, it is particularly advantageous to select the storage location in such a way that with high probability it is near the expected next request of the customer. For this purpose, it is possible for example to combine modern algorithms with personal data of the customer or to evaluate the total set of known data statistically (big data).

In another specific embodiment of the method, the storage location corresponds to a mobile store.

It is possible to select both static as well as mobile storage locations. Static storage locations may be implemented by special storehouses. Mobile storerooms are able to move intelligently for example on the basis of recorded user data in order to allow users access to their personal stowage as quickly as possible. Mobile stowage units may be implemented for example in the form of vehicles, transporters, trucks, boats or airplanes. These stowage units may also be operated in automated fashion.

Another specific embodiment of the method (FIG. 5) includes the additional step of transmitting (step 501) a limiting signal to the automatically operated vehicle, which limits the area of movement of the automatically operated vehicle. The limitation may be applicable in particular for a specifiable time period, and the limiting signal may be furthermore based in particular on recorded user data.

This specific embodiment of the present invention offers the advantage of being able to ensure for a specific time period that a personal stowage is located within a predefined area and does not leave this area. This makes it possible to ensure that a user of the personal stowage may be guaranteed that his personal stowage can be provided within a predefined time. This increases the user benefit of this mobility service and the acceptance of such systems or offers.

Another specific embodiment of the method (FIG. 6) includes the additional step of receiving (step 601) an alarm signal if a personal stowage is removed from the automatically operated vehicle and/or opened without authorization and the step of triggering (step 602) an alarm based on the alarm signal.

This specific embodiment of the present invention offers the advantage of being able to protect the personal stowage against access by third parties. This also increases the acceptance of such systems for end users because it increases the trust that personal items are secure.

In another specific embodiment of the method, in the step of triggering the alarm, the alarm signal or a modified alarm signal is transmitted to a user of the personal stowage, in particular to a mobile terminal unit of the user, for triggering an acoustic, optical or haptic warning signal for the user.

This specific embodiment of the present invention offers the advantage of informing a user in the event of unauthorized access by a third party to his personal stowage. This enables a user to develop greater trust in this system, which likewise raises the acceptance of this kind of mobility service.

Another specific embodiment of the method (FIG. 7) includes the additional step of transmitting (step 701) a release signal to a personal stowage or a storage location or to an automatically operated vehicle, by which an authorization is adapted for opening or removing the personal stowage, as a result of which in particular a triggering of an alarm signal is suppressed in the event of a removal or opening of the personal stowage by at least one additional person that differs from a primary user of the personal stowage.

This specific embodiment of the present invention offers the advantage that the user is able to provide third parties with access to the personal stowage. This makes it possible for example to use the personal stowage and the automatically operated vehicle for sending personal items to third parties. This yields a multitude of new possibilities of using the mobility service, which thereby gains in acceptance and becomes interesting for a multitude of new users.

In another specific embodiment of the method, the request signal comprises information about a size of the desired personal stowage and a personal stowage is selected and located on the basis of the request signal. A retrieval signal is transmitted in the process in order to retrieve the corresponding personal stowage using an automatically operated vehicle.

This specific embodiment of the method offers the advantage of making it possible to adapt the size of the personal stowage in individualized fashion. A user could indicate via an app for example how much personal stowage he requires or how much luggage he wants to transport. On this basis, it would be possible to select an appropriately dimensioned stowage for the user. Depending on the size of the stowage, different costs may be incurred. This increases on the one hand the comfort for the customer, and the possibilities for using the mobility service are increased as well.

In addition to the method, a device is provided in accordance with the present invention, in particular a server (e.g., FIG. 8, 801) having a transmitter and a receiver (e.g., FIG. 8, 802), the device being designed to perform the steps of a method according to one of the methods at the basis of the present invention in corresponding units.

Moreover, a computer program is provided in accordance with the present invention, comprising commands that prompt a computer, when executing the program, to implement a method in accordance with the present invention.

Furthermore, a machine-readable storage medium is provided in accordance with the present invention, on which this computer program is stored.

Moreover, a system is provided in accordance with the present invention for providing personal stowage using a highly or fully automatically operated vehicle. The system comprises here at least an automatically operated vehicle (e.g., FIG. 8, 803), a personal stowage (e.g., FIG. 8, 804) and a server (e.g., FIG. 8, 801) having a transmitter and a receiver interface. The server receives a request signal, which includes information about a desired provisioning location for providing the personal stowage. Additionally, a location of the requested personal stowage and a provisioning signal are transmitted to the automatically operated vehicle, the automatically operated vehicle providing the personal stowage at the provisioning location based on the provisioning signal.

This system may be adapted in accordance with the specific embodiments indicated above of the methods at the basis of the present invention. The disclosed method variations may consequently be components of this system.

DETAILED DESCRIPTION OF EXAMPLE EMBODIMENTS

Figure 1:
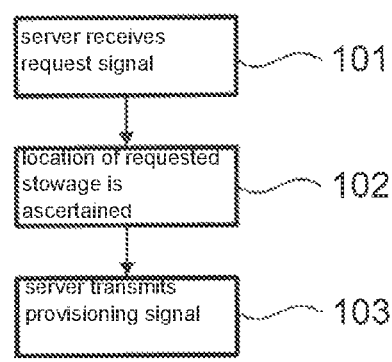
FIG. 1 schematically shows a method sequence.
Figure 3:
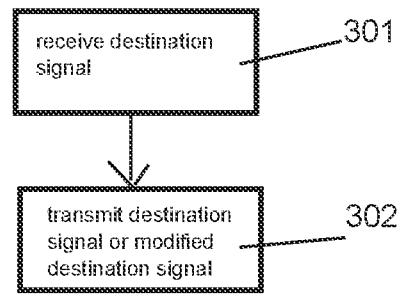
FIGS. 3-7 show additional steps in accordance with example embodiments of the present invention.
Figure 4:
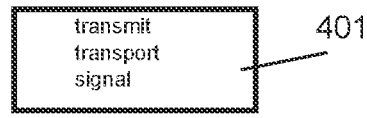

FIG. 1 shows a method sequence of a first exemplary embodiment of the present invention. In this method, a user of an automatically operated vehicle is provided with personal stowage. The personal stowage is in this example a lockable metal box (alternatively, other materials such as plastic or leather are also conceivable), which may be situated in an automatically operated vehicle in the interior of the vehicle so as to be accessible to the driver. In this exemplary embodiment, the automatically operated vehicle is a vehicle without a driver, which is able to move autonomously in the city and in the countryside.

To use this vehicle with the personal stowage, a user of the automatically operated vehicle is able to request the vehicle via an app. The method shown in FIG. 1 is implemented in order to provide the automatically operated vehicle including the personal stowage.

In step 101, a server receives a request signal, which includes information about a desired provisioning location for providing a personal stowage. In this exemplary embodiment, the request signal is received in response to an input by the user on his mobile telephone.

In step 102, the location of the requested personal stowage is ascertained. A personal stowage is assigned to the user. In this exemplary embodiment, this assignment occurs via the app, in which the user logged on with a personal account. The personal stowage is in turn assigned to this account. In this exemplary embodiment, the personal stowage is located in a storehouse for personal stowage units, into which it was transported after its last use.

In step 103, the server transmits a provisioning signal to an automatically operated vehicle. Based on this provisioning signal, the automatically operated vehicle moves to the storehouse in which the personal stowage is located. At the storehouse, this personal stowage is loaded into the vehicle, whereupon the automatically operated vehicle together with the personal stowage moves in the direction of the provisioning location and finally provides the personal stowage at the desired provisioning location.

In an alternative exemplary embodiment, the personal stowage is fixedly connected to an automatically operable vehicle. In this method, it is consequently sufficient when ascertaining the location of the requested personal stowage that the position of the automatically operated vehicle is ascertained in which the personal stowage is located.

Figure 2:
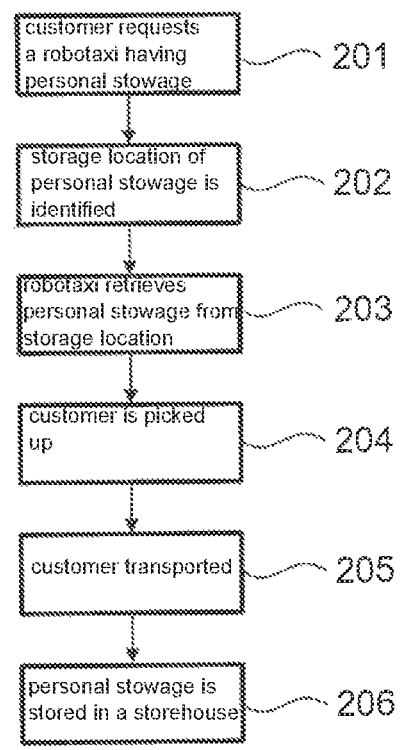
FIG. 2 schematically shows another method sequence.
Figure 5:
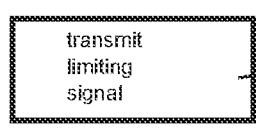
Figure 6:
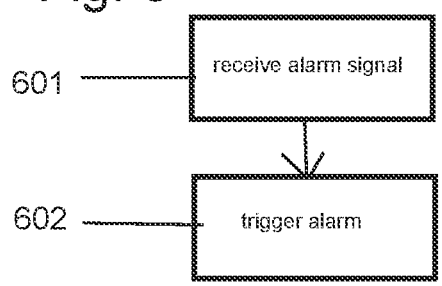
Figure 7:
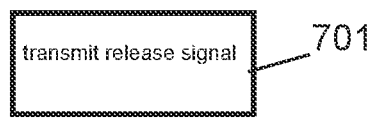
Figure 8:
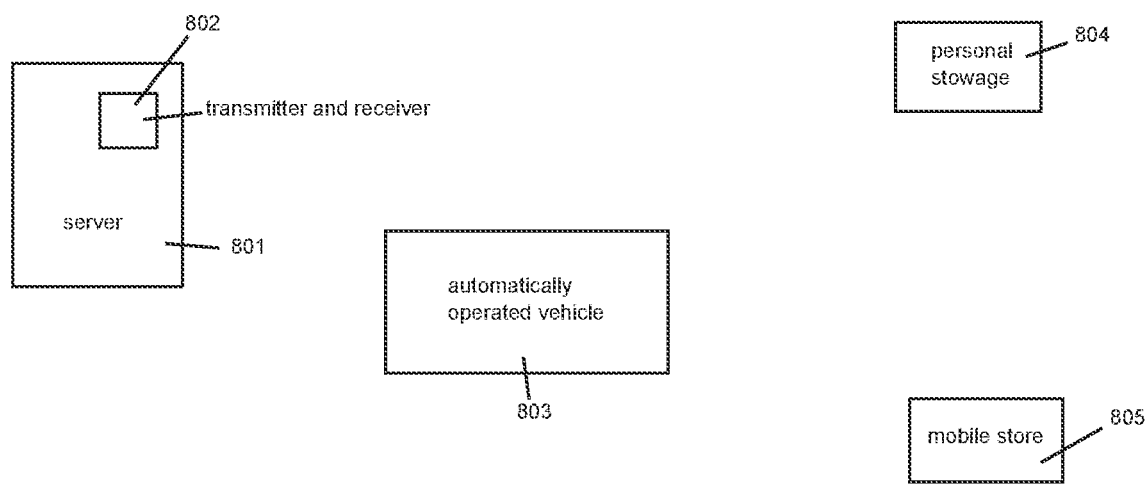
FIG. 8 shows a system in accordance with an example embodiment of the present invention.

FIG. 2 shows a schematic method sequence of another exemplary embodiment. In this exemplary embodiment, the automatically operated vehicle is likewise a vehicle that is able to move autonomously in an urban area without human intervention. This vehicle is hereinafter called a robotaxi.

In step 201, a customer requests a robotaxi having personal stowage. This request preferably occurs online, for example via an app of a smart phone. Alternatively, the robotaxi may also be requested via a telephone call or via an order placed on a computer.

The request is associated with a desired location as well as a desired time.

In addition, in the event of a request, a destination is ascertained to which the customer would like to be transported by the automatically operated vehicle together with his personal stowage.

In step 202, the storage location of the personal stowage is identified. On the basis of the request, the system identifies the current storage location of the personal stowage. In this exemplary embodiment, a container is associated with the respective customer.

In step 203, a robotaxi retrieves the personal stowage from the storage location. The robotaxi drives to the ascertained storage location and retrieves the personal stowage. In this exemplary embodiment, the personal stowage was selected in the form of a standardized container, which is able to be processed by automated logistical processes. The container has a bar code for this purpose. Alternatively or additionally, it may also include a QR code or an RFID tag. In this exemplary embodiment, the robotaxi is able to open the trunk at the storage location, whereupon an automated loading process is performed by a robot. This robot is capable of loading personal stowage units of different sizes into different vehicles.

In step 204, the customer is picked up at the desired location by the automatically operated vehicle that transports the personal stowage of the customer. Upon being picked up, the customer has access to his personal stowage.

In step 205, the customer is transported by the robotaxi from the desired location to the destination he indicated.

In step 206, the personal stowage is stored in a storehouse. After the customer exits the vehicle, the system selects a suitable storage location for the personal stowage. In this exemplary embodiment, the storage location is selected in such a way that with high probability it is near the expected next request of the customer. In this exemplary embodiment, modern algorithms that use personal data of the customer are used for this ascertainment. These data are linked and/or are statistically evaluated for ascertaining the optimal storage location.

In another exemplary embodiment, the personal stowage of the customer is not retrieved only after the request of the vehicle, but in the case of a presumed demand is already retrieved from the storage location in advance. The respective robotaxi is then used in a spatially restricted way in the area of the presumed request by the customer, so that it is available for the customer at short notice. The decision may be made for example by calculating a probability, the probability having to surpass a limit value (e.g. 80%). This specific embodiment has in particular the advantage of reducing the waiting time for customers markedly. This increases customer benefit and the acceptance of the mobility service.

In another exemplary embodiment, when exiting, the customer is able to select the option for his personal stowage to be available again quickly for a limited time period (e.g., 1 to 24 hours). If this option is selected, the personal stowage is not put back into storage and the respective robotaxi is used only in spatial proximity of the expected subsequent retrieval location. This specific embodiment also reduces the waiting time for the robotaxi having the personal stowage.

In another exemplary embodiment, the personal stowage is not put back into storage if it is empty after the customer has left. The associated container is rather available to the next customer who orders a new, empty personal stowage. This implementation of the method has in particular the advantage of saving trips to the storage location and storage processes. Additionally, the waiting time of a subsequent customer for an empty personal stowage is reduced. This saves costs and raises the acceptance of the mobility service.

In another exemplary embodiment, multiple personal stowage units are transported in a robotaxi. In order to protect these against unauthorized access, they may be protected for example by a numerical code, a fingerprint scanner or a digital protection (e.g., contactless opening by smartphone). In order to protect these against unauthorized removal, it is possible to ascertain removal of a container for example, and to trigger an alarm. This security system has the advantage of making it possible to provide a greater number of personal stowage units in the vicinity of the expected retrieval locations through the combination with modern algorithms. This saves transport processes for the personal stowage units and raises the acceptance of the mobility service.

In another exemplary embodiment, a customer is allowed to make his personal stowage available to another customer. This allows another customer to order the personal stowage as well. This specific embodiment has the advantage in particular that persons having a close relationship for example are able to access a shared stowage. Alternatively, this may also be used for transporting goods. This increases customer benefit and the acceptance of the mobility service.

In another exemplary embodiment, the customer is able to order different sizes and/or several separated personal stowage units. This likewise increases customer benefit and the acceptance of the mobility service.

In another exemplary embodiment, an additional step is introduced, which may be performed prior to storing the personal stowage, during the storage period, or when retrieving the stowage from the storehouse. In this step, the content of the personal stowage is processed by a service provider following the order of the customer. This processing may be for example a process of cleaning the content of the personal stowage. Thus, for example, it is possible for the customer to deposit dirty clothing items (e.g. after a visit to a fitness studio) in the personal stowage. Prior to putting the stowage into storage, the clothing items are cleaned so that they are available in a clean state in the next request by the customer.

In a special exemplary embodiment, a cleaning signal is received in this instance by a central server, which was sent from a mobile telephone of the customer. Based on this cleaning signal, an execution signal is transmitted from a central server to a cleaning robot in the storage facility or in the vicinity of the storage facility in which the personal stowage is located. This cleaning robot is activated based on this execution signal and cleans the interior and the content of the personal stowage.

What is claimed is:

1. A method for providing personal stowage using a highly or fully automatically operated vehicle, comprising:
receiving a request signal, which includes information about a desired provisioning location for providing a personal stowage;
ascertaining a location of the requested personal stowage; and
transmitting a provisioning signal to an automatically operated vehicle, and, based on the provisioning signal, the automatically operated vehicle: (i) moving to the ascertained location, (ii) retrieving the requested personal stowage from the ascertained location, and (iii) providing the retrieved personal stowage at the provisioning location using the automatically operated vehicle.

2. The method as recited in claim 1, further comprising:
receiving a destination signal, which contains information about a destination for which the automatically operated vehicle is to head; and
transmitting the destination signal or a modified destination signal to the automatically operated vehicle for automatically driving the automatically operated vehicle from the provisioning location to the destination.

3. The method as recited in claim 1, further comprising:
transmitting a transport signal for transporting the retrieved personal stowage to a storage location using the automatically operated vehicle.

4. The method as recited in claim 3, wherein the storage location is ascertained on the basis of recorded user data.

5. The method as recited in claim 3, wherein the storage location is a mobile store.

6. The method as recited in claim 1, further comprising:
transmitting a limiting signal to the automatically operated vehicle, which limits an area of movement of the automatically operated vehicle for a specifiable period, the limiting signal being based on recorded user data.

7. The method as recited in claim 1, further comprising:
receiving an alarm signal when the personal stowage is:
(i) removed from the automatically operated vehicle, and/or (ii) opened, without authorization; and
triggering an alarm based on the alarm signal.

8. The method as recited in claim 7, wherein in the step of triggering the alarm, the alarm signal or a modified alarm signal is transmitted to a user of the personal stowage.

9. The method as recited in claim 8, wherein the alarm signal or the modified alarm signal is transmitted to a mobile terminal unit of the user for triggering an acoustic, optical or haptic warning signal for the user.

10. The method as recited in claim 7, further comprising:
transmitting a release signal to a personal stowage or a storage location or to an automatically operated vehicle, by which an authorization is adapted for opening or removing the personal stowage, as a result of which in a triggering of an alarm signal is suppressed in the event of a removal or opening of the personal stowage by at least one additional person that differs from a primary user of the personal stowage.

11. The method as recited in claim 1, wherein the request signal includes information about a size of a desired personal stowage, and the personal stowage being selected and located based on the request signal.

12. A server, including a transmitter and a receiver, the server configured for providing personal stowage using a highly or fully automatically operated vehicle, the server configured to:
receive a request signal, which includes information about a desired provisioning location for providing a personal stowage;
ascertain a location of the requested personal stowage; and
transmit a provisioning signal to an automatically operated vehicle, and, based on the provisioning signal, the automatically operated vehicle: (i) moves to the ascertained location, (ii) retrieves the requested personal stowage from the ascertained location, and (iii) provides the retrieved personal stowage at the provisioning location using the automatically operated vehicle.

13. A non-transitory machine-readable storage medium on which is stored a computer program for providing personal stowage using a highly or fully automatically operated vehicle, the computer program, when executed by a computer, causing the computer to perform:
receiving a request signal, which includes information about a desired provisioning location for providing a personal stowage;
ascertaining a location of the requested personal stowage; and
transmitting a provisioning signal to an automatically operated vehicle, and, based on the provisioning signal, the automatically operated vehicle: (i) moving to the ascertained location, (ii) retrieving the requested personal stowage from the ascertained location, and (iii) providing the retrieved personal stowage at the provisioning location using the automatically operated vehicle.

14. A system for providing personal stowage using a highly or fully automatically operated vehicle, comprising:
at least one automatically operated vehicle;
a personal stowage; and
a server having a transmitter and a receiver interface, the server receiving a request signal, which contains information about a desired provisioning location for providing the personal stowage, a location of the requested personal stowage being ascertained and a provisioning signal being transmitted to the automatically operated vehicle, and, based on the provisioning signal, the automatically operated vehicle: (i) moving to the ascertained location, (ii) retrieving the requested personal stowage from the ascertained location, and (iii) providing the retrieved personal stowage at the provisioning location.

15. The method as recited in claim 3, wherein the storage location is a storehouse.

16. The method as recited in claim 3, the method further comprising:
prior to storing of the personal stowage at the storage location, cleaning contents of the personal stowage.

17. The method as recited in claim 1, wherein the personal stowage is assigned to the user.

18. The method as recited in claim 1, wherein at the ascertained location, a robot automatically loads the requested personal stowage into the automatically operated vehicle.

19. The method as recited in claim 1, wherein the automatically operated vehicle is a robotaxi configured to transport a user in addition to the retrieved personal stowage.

20. A method for providing personal stowage using a highly or fully automatically operated vehicle, comprising:
   receiving a request signal from a user, which includes information about a desired provisioning location for providing a personal stowage;
   ascertaining a location of the requested personal stowage;
   transmitting a provisioning signal to an automatically operated vehicle for providing the personal stowage at the provisioning location using the automatically operated vehicle, the provided personal stowage being assigned to the user; and
   transmitting a limiting signal to the automatically operated vehicle, which limits an area of movement of the automatically operated vehicle and the provided personal stowage assigned to the user, for a specified time period.

* * * * *